April 29, 1952  D. McNICOLL  2,594,578
TAPERED ROLLER BEARING
Filed Nov. 4, 1949  2 SHEETS—SHEET 1

INVENTOR:
David McNicoll,
BY
His ATTORNEYS.

April 29, 1952  D. McNICOLL  2,594,578
TAPERED ROLLER BEARING
Filed Nov. 4, 1949  2 SHEETS—SHEET 2

INVENTOR:
David McNicoll,
BY Carr Herr Gravely
His ATTORNEYS.

Patented Apr. 29, 1952

2,594,578

UNITED STATES PATENT OFFICE 2,594,578

TAPERED ROLLER BEARING

David McNicoll, Solihull, Birmingham, England, assignor to The Timken Roller Bearing Company, Canton, Ohio, a corporation of Ohio Application November 4, 1949, Serial No. 125,429
In Great Britain March 23, 1948

2 Claims. (Cl. 308—174)

This invention relates to tapered-roller bearings of the self-contained unit kind comprising inner and outer race members in combination with two or more rows or series of tapered rollers which co-operate with their race surfaces so as to cause the said race members to be interlocked with one another in the direction of the axis of the bearing.

The object of the present invention is to provide a self-contained tapered-roller bearing unit of the above kind which is designed and assembled in a simple and convenient manner so as to produce a unit in which the parts cannot become separated from one another or fall apart during normal operation and handling.

Tapered-roller bearing units have been proposed in which both inner and outer race members have had shoulders engaged by two rows of rollers, the unit being assembled by relative axial movement of inner and outer members with the rollers mounted on one of them, so that the rollers have snapped over the shoulders provided on the other member.

According to the present invention, a self-contained tapered-roller bearing assembly unit comprises inner and outer race members and two rows of tapered rollers between the said inner and outer race members, and is characterised by the fact that the large ends of each row of rollers engage a shoulder on an inner or outer race member, the co-operating outer or inner race member having no roller-engaging shoulder, and that the bearing is assembled, to form a self-contained unit, by moving inner and outer race members axially relatively to one another so that the portion adjacent the larger-diameter end of a conical track surface on an inner race member enters and passes beyond a portion at an end of an outer member which is adjacent the smaller-diameter end of a conical track surface thereon, the said end portion on one of the race members being also forced or passed over ends of a row of rollers while the larger ends of said rollers are supported against the shoulder on the other race member, the apex angle of the rollers being restricted to a degree such that the said passage of the one race member over the ends of the rollers is permitted by elastic deformation and/or by heating or cooling, without permanent deformation of the bearing components, so that in the final position of the bearing parts the inner and outer race members are interlocked in the axial direction by means of the tapered rollers.

Also, according to the invention, a self-contained bearing assembly unit comprises inner and outer race members and two rows of tapered rollers between the inner and outer race members with their larger ends engaging shoulders on a race member or members, and is characterised by the fact that the bearing is assembled to form a self-contained unit by moving inner and outer race members axially relatively to one another so that the portion adjacent the larger-diameter end of a conical track surface on the inner race member enters and passes beyond a portion at an end of an outer race member which is adjacent the smaller-diameter end of a conical track surface thereon, and is also forced or passed over the smaller ends of a row of rollers while the larger ends of said rollers are supported against a shoulder on said outer race member, the apex angle of the rollers being restricted to a degree such that the passage of the one race member over the smaller ends of the rollers is permitted by elastic deformation and/or by heating or cooling, without permanent deformation of the bearing components, so that in the final position of the bearing parts the inner and outer race members are interlocked in the axial direction by means of the tapered rollers.

Figure 1 of the accompanying drawing is a section through a bearing constructed and assembled in accordance with one form of the present invention.

Figure 1:
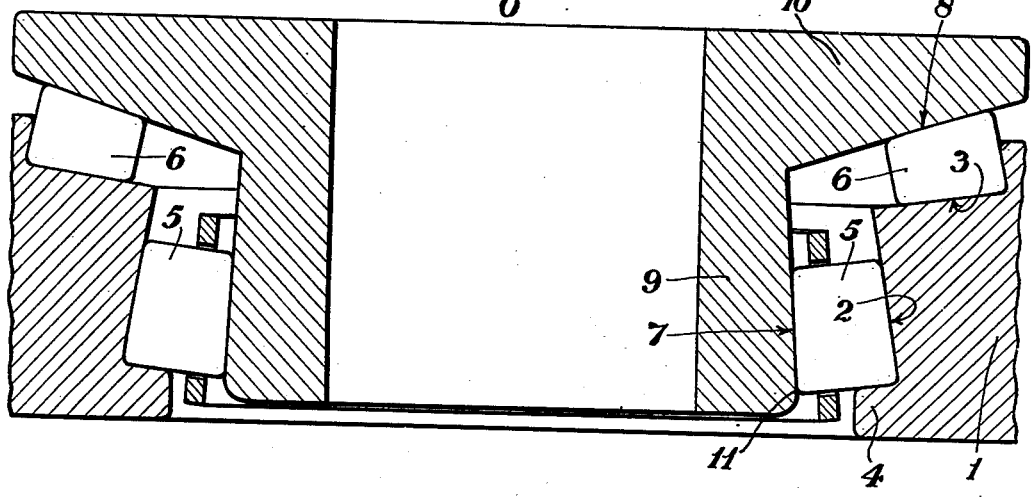
Figure 2:
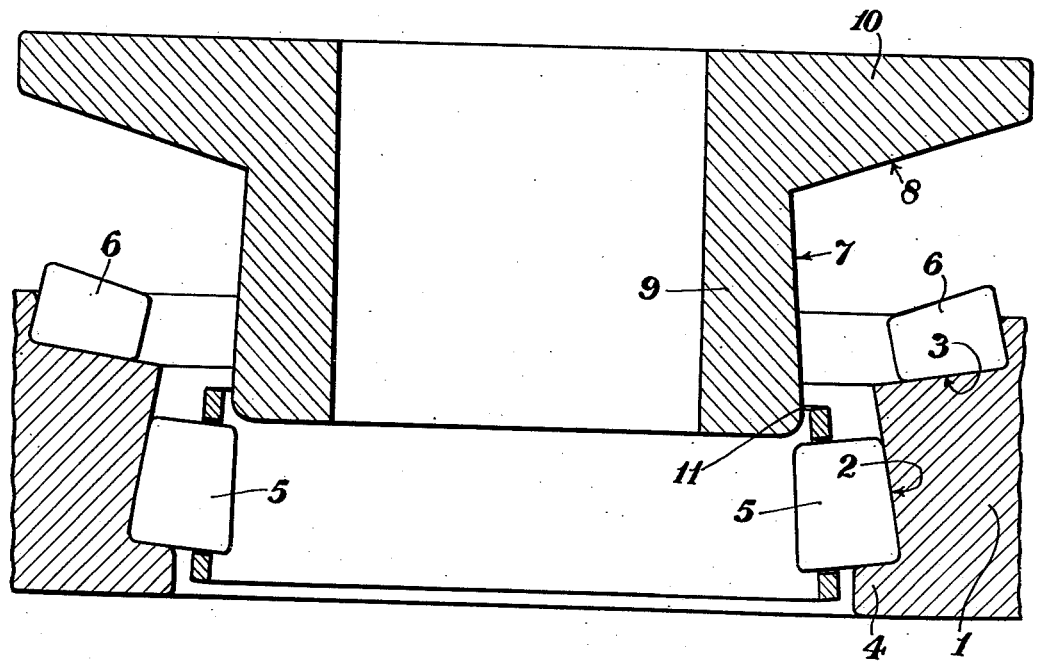
Figure 2 shows the parts of this bearing in their initial relative positions at the commencement of the assembly operation.

Referring to Figures 1 and 2 of the said drawings, which are intended merely to be diagrammatic views to illustrate the principle of the invention, the combined radial and thrust load tapered-roller bearing shown in the said figures comprises a one-piece outer bearing member 1 having two conical roller tracks 2, 3, the former being a main radial-load track having a relatively small included apex angle so as to make a small angle with the axis of the bearing, and the other being a thrust track having a relatively large included apex angle, being, for example, at nearly 90° to the first-named track, and making a large angle with the bearing axis.

A thrust rib 4 is provided at the large end of the first-named or radial load track 2, and two rows of tapered rollers 5, 6, are interposed between the said respective tracks 2, 3, on the outer bearing member 1 and co-operating conical tracks 7, 8, on a one-piece inner bearing member. This inner bearing member comprises an axially-extending portion 9 at one end, of tapering section longitudinally, having the conical race track 7 to run upon the radial load rollers 5, and, at the other end, an outwardly-extending rear flange 10 having the conical forwardly-presented track surface 8 adapted to run upon the second row of rollers 6 on the thrust track of the outer bearing member. Thus, the axial portion 9 of the inner member, with the one set of rollers 5 thereon and the race track 2 therefor on the outer member, constitute a radial-load bearing; and the rear flange portion 10, with the thrust rollers 6 thereon and the thrust track 3 on the outer member, constitute a thrust bearing.

The thrust rib 4 is thus at the forward end of the complete bearing, with the thrust race 8 at the rear. The tapered rollers 5 on the radial-load track have a relatively small included apex angle, the angle of the track 7 on the inner bearing member corresponding to this small angle, and when these rollers are seated upon their track 2 on the outer member, before the inner member 9 is fitted, as in Figure 2, the clear bore through them is in the form of a cone with a small apex angle. That is to say, the difference in internal diameter of the clear bore at the forward or large ends of the rollers 5 and at the rear or small ends of the rollers is very small. The thrust rollers 6 at the rear of the bearing have a comparatively large included apex angle.

If the taper of the main radial-load tracks 2, 7, and rollers 5 is appropriately chosen the difference in diameter between the opposite ends of the clear conical bore through the rollers, before the inner member is fitted, can be made so small that it is possible to force the inner member 9 past the small inner ends of the said rollers until it reaches its final position when its track is in contact with the length of the rollers. Thus, the maximum diameter of the main axial portion 9 of the inner member, that is, at the forward end, is made an interference fit in relation to the smaller rear end of the clear bore through the rollers 5, being very slightly larger in diameter than that of the said inner end of the clear bore. Also, the outer corner of the said forward end of the inner bearing member 9 is rounded off or chamfered at 11 to a suitable radius, and the corners at the inner smaller ends of the rollers 5 are also rounded off or chamfered.

To assemble the bearing, the outer race member 1 is placed horizontally on a support, as in Figure 2, with the thrust track uppermost, and the two sets of rollers 5, 6, are assembled on their respective tracks, the radial-load rollers 5 resting with their larger ends on the thrust flange 4 and lying closely against their track, in conical formation, in order to produce the clear conical bore above referred to. The inner race member 9 is then introduced into this bore by a vertical axial movement under suitable pressure, so as to cause its forward rounded outer end 11 to engage and spring past the rounded corners of the small ends of the rollers 5, due to slight deformation of the metal, until the race surface on the thrust flange seats itself upon the upper series of rollers, as in Figure 1.

When the bearing has been so assembled the main radial load track 7 on the inner member will have been restored to its initial condition and will be substantially in close engagement with the full length of the rollers; and it may be arranged, if desired, for it to exert an inherent pressure upon the rollers, giving a pre-loaded condition. After such assembly, it will be impossible for the parts of the bearing to come apart under normal use or handling, so that a self-contained unit is produced. The inner bearing member 9 cannot be displaced axially in the reverse direction to that employed when assembling, that is, towards the apex, as when force is applied in that direction the rollers 5 tend to slide inwards away from the thrust rib 4, and wedge the inner member in position, thereby preventing the dismantling of the bearing and making a self-locking unit assembly.

If desired, especially in the case of large bearings, the introduction of the inner race members past the small ends of the rollers may be facilitated or allowed for by expanding the outer member, as by heating it, and/or by contracting the inner member, as by cooling it.

The amount of interference permissible between an inner race member and the small ends of the rollers depends on the natural elasticity of the metal and on the thickness and other dimensions of the bearing members, particularly that of the outer member.

In actual practice it has been found that an interference fit of .008" will permit of a forced assembly being obtained without marking of the rollers or races, whilst with an interference fit of .010" only slight marking results.

Instead of assembling the bearing by direct axial pressure between the inner and outer members, the said members may be relatively spun or rotated simultaneously with the application of an axial force, and with this method assembly can be obtained without material damage to the components with steeper angles of the rollers and race surfaces than would be possible merely with a direct axial force.

The same general principle of assembly to produce a unit assembly with the parts held together by the co-operation of the taper rollers with their race surfaces, may be applied to other forms of taper-roller bearings.

Figure 3:
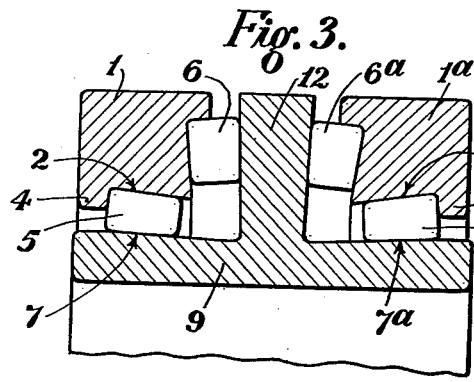
Figure 3 is a longitudinal section through a modified form of the invention.

Thus, as shown diagrammatically in Figure 3, a combined radial lead and thrust bearing may comprise a single inner axially-extending bearing member 9 having opposite ends provided with oppositely-coned race surfaces 7, 7ª, the larger ends of which are at the ends, in combination with two rows of tapered rollers 5, 5ª, of small apex angle, having their larger ends outwards and being interposed between the said respective race surfaces 7, 7ª, on the inner member and conical race surfaces 2, 2ª, on two separate outer bearing members 1, 1ª, one for each row of rollers, said outer members having thrust ribs 4, 4ª, at their outer ends. These outer members 1, 1ª, are spaced apart by a thrust bearing consisting of a circumferential flange 12 around the middle of the inner member with two rows of tapered thrust rollers 6, 6ª, interposed between conical race surfaces on opposite sides of this flange and conical race surfaces on the two respective outer members. The bearing would be assembled by springing the ends of the inner member 9 past the small ends of the radial load rollers 5, 5ª, whilst they are held against their thrust ribs, the two ends being assembled in succession.

Figure 4:
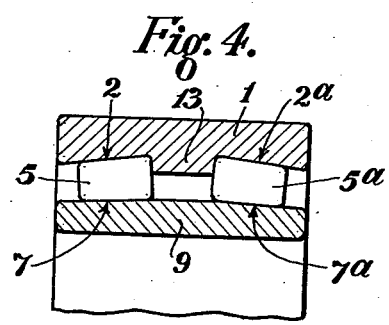
Figures 4, 5, 6 and 7 are sectional views through further modifications.

Or, as shown in Figure 4, the bearing may be a double-row symmetrical journal bearing, the inner member 9 having conical track surfaces 7, 7ª, at opposite ends, with the smaller ends outwards, two rows of tapered rollers 5, 5ª, having small apex angles, whose smaller ends are outwards, being interposed between these respective track surfaces and corresponding conical races 2, 2ª, at opposite ends of a single outer bearing member 1, a central thrust rib 13 on the latter engaging the inner larger ends of the two rows of rollers. The parts would be assembled under axial or axial and rotary pressure, so that the rollers, by co-operating with their races, prevent separation of the parts in normal use.

Figure 5:
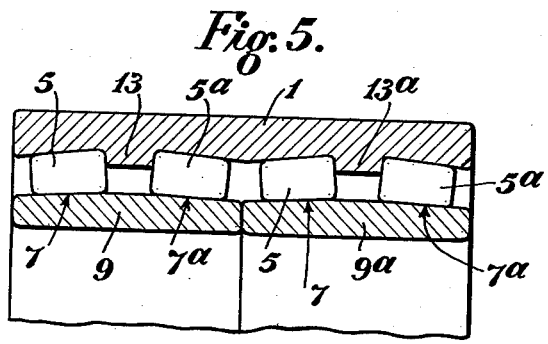

Again, as shown in Figure 5, the bearing could be a four-row journal bearing with two separate inner race members 9, 9ª, abutting in alignment and each supporting two rows of rollers 5, 5ª, of small apex angle running on oppositely-sloping conical race surfaces 7, 7ª, at opposite ends of each inner member, and all four rows of rollers being enclosed within a one-piece outer member 1 having four conical race surfaces corresponding to the respective rows of rollers, said outer member having thrust ribs 13, 13ª, located between the adjacent large ends of the two rows of rollers 5, 5ª, on each inner member. Similarly a bearing having a single outer member and any number of inner members and rows of rollers may be constructed. The bearing could comprise a one-piece inner member having four race tracks, being equivalent to the two members 9, 9ª, of Figure 5, and two outer members each with two tracks, being equivalent to the member 1 of Figure 5 if divided at the middle.

Figure 6:
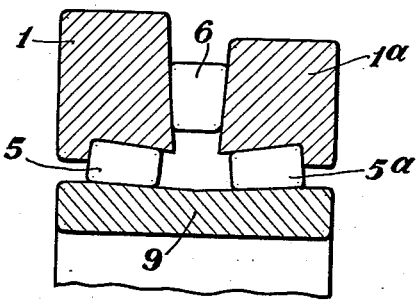

In a further design, shown in Figure 6, a combined radial load and thrust bearing may be similar to that shown in Figure 3, but instead of the inner member 9 carrying a flange at the middle to receive on opposite faces the two rows of thrust rollers 5, 5ª, a single row of tapered thrust rollers 6 is interposed directly between conical race surfaces on the opposed faces of the two separate outer bearing members 1, 1ª, said thrust rollers 6 being disposed with their axes radial to and in a plane perpendicular to the bearing axis, and the rollers 6 having their larger ends outwards.

Figure 7:
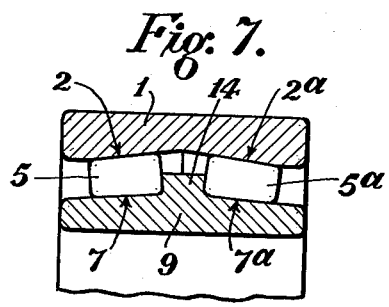
Figure 8:
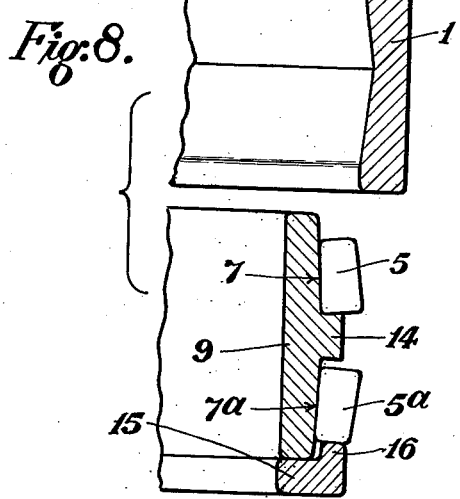
Figure 8 shows how the form of bearing in Figure 7 is assembled.

The further modification shown in Figures 7 and 8 is similar to that shown in Figure 4, but the central thrust rib 14 is provided on the inner member 9 instead of on the outer member. This rib 14 is engaged by the large ends of the rollers 5, 5ª, disposed between the race surfaces 7, 7ª, on the inner member and the race surfaces 2, 2ª, on the outer member 1, and in this case the bearing is assembled as illustrated in Figure 8. Thus, the inner member 9 is placed horizontally on a support 15 which has a series of fingers 16 contacting the small ends of the lower row of rollers 5ª which have been assembled around the track 7ª and have been allowed to move away from the rib 14 by an amount sufficient to reduce slightly the diameter across their large ends. The outer race member 1 is then lowered and forced over the rollers by first passing it over the small ends of the top row of rollers 5, while the latter are assembled on the track 7 and are supported on the rib 14, and then forcing it over and beyond the large ends of said rollers, by elastic deformation of the parts, and finally over the large diameter of the bottom row of rollers 5ª while the latter are supported upon the fingers 16.

I claim:

1. A self-contained tapered-roller bearing comprising a one-piece outer bearing member having two conical roller tracks one being a main radial-load track having a relatively small included apex angle and the other being a thrust track having a relatively large included apex angle, a one-piece inner bearing member comprising an axially-extending portion at one end having a conical race track the largest diameter of which is at the outer end of said portion, and an outwardly-extending radial flange at the other end having a conical thrust track surface, and two rows of tapered rollers between the respective pairs of opposed tracks of the two members with their larger ends outwardly of their smaller ends and respectively adjacent the outer end of said axially-extending portion and the outer portion of said outwardly-extending radial flange, the outer end of the axially-extending portion of the inner bearing member having a diameter larger than the clearance diameter at the inner ends of the cooperating rollers such that said outer end of the axially-extending portion is engaged past the inner ends of said cooperating rollers by elastic deformation so that in assembled relationship of the bearing parts said inner and outer bearing members are interlocked in the axial direction by means of the tapered rollers.

2. A self-contained tapered-roller bearing comprising a one-piece outer bearing member having a conical radial load main race with a relatively small included apex angle and an angularly related conical thrust race having a relatively large included apex angle, a one-piece inner bearing member having a radial load race cooperating with said main race, one end of said inner bearing member being of greater diameter than the other end, said other end of the inner bearing member having a radially directed flange provided with a conical race cooperating with said thrust race on said outer bearing member, an uninterrupted thrust rib on said outer bearing member adjacent said one end of the inner bearing member, and tapered rollers for said cooperating races between said inner and outer bearing members, the tapered rollers between said radial load races having their larger diameter ends in abutment with said uninterrupted thrust rib, said one end of said inner bearing member being of an outside diameter greater than the clear bore defined by the smaller diameter ends of said tapered rollers between the radial load races such that in assembly said one end of said inner bearing member can be deformed within its elastic limits for passage through said clear bore and when assembled said inner bearing member is reformed so that the bearing components are interlocked from movement in an axial direction.

DAVID McNICOLL.

REFERENCES CITED

The following references are of record in the file of this patent:

UNITED STATES PATENTS

| Number | Name | Date |
|---|---|---|
| 881,471 | Hoffman | Mar. 10, 1908 |
| 1,153,066 | Gurney | Sept. 7, 1915 |
| 1,224,346 | Winquist | May 1, 1917 |
| 1,356,326 | Palmgren | Oct. 19, 1920 |
| 1,803,591 | Bott | May 5, 1931 |
| 2,449,944 | Johnson | Sept. 21, 1940 |